J. H. MILLER.
MARKING DEVICE.
APPLICATION FILED AUG. 7, 1917.
1,335,125.
Patented Mar. 30, 1920.
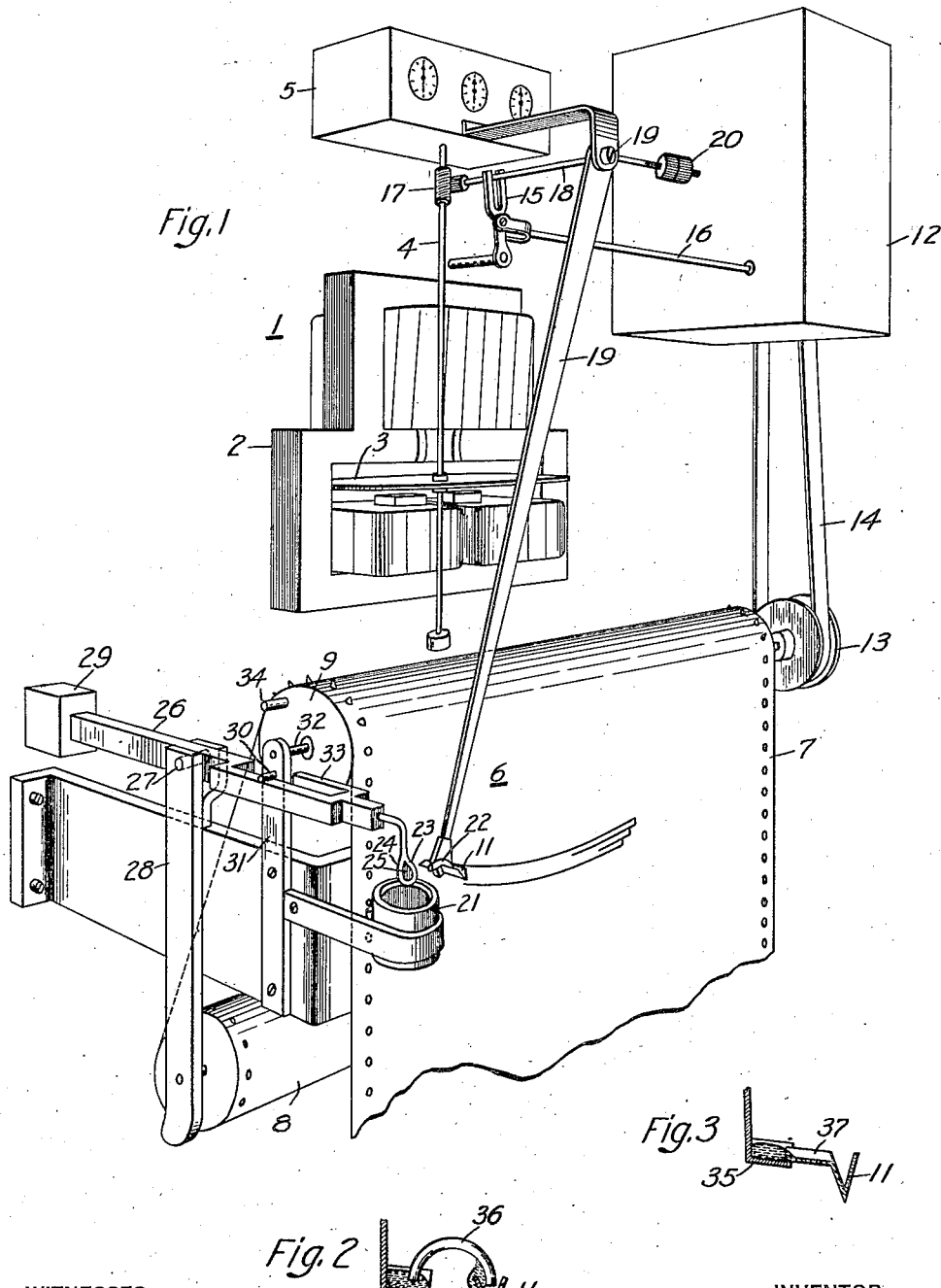
INVENTOR
John Harold Miller
BY
ATTORNEY
WITNESSES:

UNITED STATES PATENT OFFICE.

JOHN HAROLD MILLER, OF WILKINSBURG, PENNSYLVANIA, ASSIGNOR TO WESTINGHOUSE ELECTRIC & MANUFACTURING COMPANY, A CORPORATION OF PENNSYLVANIA.

MARKING DEVICE.

1,335,125.  Specification of Letters Patent.  Patented Mar. 30, 1920.

Application filed August 7, 1917. Serial No. 184,811.

*To all whom it may concern:*

Be it known that I, JOHN HAROLD MILLER, a citizen of the United States, and a resident of Wilkinsburg, in the county of Allegheny and State of Pennsylvania, have invented a new and useful Improvement in Marking Devices, of which the following is a specification.

My invention relates to marking devices and particularly to such devices as are used in connection with measuring instruments.

One object of my invention is to provide a measuring instrument having a recording stylus or pen that may be periodically supplied with a small quantity of ink from an external source, thereby insuring a pen that shall have a constant supply of ink and that shall require a minimum amount of operating torque.

Another object of my invention is to provide a device of the above-indicated character that shall be simple and inexpensive to construct and effective in its operation.

Heretofore, it has been customary, in some graphic-type instruments, to provide reservoir pens that were designed to carry enough ink to last a considerable period of time. This permitted a variable marking characteristic by reason of the change in loads and the variation in the quantity of the ink, thus causing variations in the accuracy with which these instruments were able to operate.

Some types of instruments that used wicks or other feeding devices required considerable care and delicacy of adjustment.

In view of the above, I provide a recording pen that is periodically supplied with small quantities of ink from an independent source. This relieves the pen of any considerable encumbering weight or connections and permits it to be freely operated by a substantially constant torque.

Figure 1 of the accompanying drawings is a perspective diagrammatic view of portions of a measuring instrument embodying my improved marking device, and Figs. 2 and 3 are sectional detail views of modified forms of my device.

Copending application Serial No. 153,301, filed March 8, 1917, by William Bradshaw and assigned to the Westinghouse Electric and Manufacturing Company, discloses a maximum-demand meter in connection with which type of instrument my invention may preferably be used. Under load conditions, a gear train actuates an integrating mechanism in the usual manner. At the same time, an ink-carrying pen is caused to advance across a record blank a distance that is proportional to the energy used. At the end of predetermined time intervals, the record blank is advanced, and, after the blank is advanced, the pen is released from its actuating means and a weight member returns the same to its initial position. In this manner, while the total energy consumption is being registered, a permanent record of the demand for given intervals of time is obtained.

Referring to the drawings, an instrument 1 comprises a stationary magnetizable core member 2 having potential and current coils thereon and a rotatable armature 3. The armature 3 is mounted on a shaft 4 that is adapted to actuate an integrating mechanism 5 and a marking device 6. A record blank 7 is fed from a supply roll 8 by an actuating roller 9 in order that it may coöperate with a stylus or pen 11.

The roller 9 is operatively connected, through a pulley wheel 13 and a belt 14, to a clock mechanism 12 that is adapted to periodically advance the same. After each advance of the record blank 7, the pen 11 is disconnected from the driving shaft 4 by the operation of a rocker yoke 15. The yoke 15 is actuated by the clock 12 through a rod 16 and is adapted to disengage gear wheels 17 that are connected between the shaft 4 and a shaft 18.

The shaft 18 is mounted, at one end, in a pivot bearing 19. The other end of the shaft 18 has a sufficient side movement to permit disengagement of the gear wheels 17. The shaft 18, carrying a pen arm 19, is adapted to be turned through a predetermined angle by the driving shaft 4 and to be returned to its initial position by a weight member 20 when the gear wheels 17 are disengaged.

Having described a recording device in which a periodically advanced record blank coöperates with a movable pen, I will now describe my novel inking device that may be used in connection therewith.

A stationary ink well 21 is positioned at one side of the record blank 7 adjacent the initial position of the pen. A crooked tube 22, having a fine bore, leads to the channel of the pen 11, from a point outside the same. The outer end of this tube is adapted to coöperate with a dipper 23 for the purpose of conveying ink from the dipper to the pen. The dipper 23 comprises a loop of wire 24 or other suitable device that is adapted to form a film of ink 25 when it dips into the well 21.

The dipper 23 is mounted on one end of a beam 26 that is pivoted on a pin 27 in a stationary supporting member 28. A weight member 29 is mounted on the other end of the beam 26 to overbalance the dipper 23 and thus tend to keep the same out of the well 21. The position of the dipper 23, when it is out of the well 21, is determined by the limit of movement imposed on the beam 26 by a pin 30 mounted on a stationary arm 31 which also acts as a bearing for a shaft 32 of the roller 9.

The beam 26 is of such shape between the pin 27 and the dipper 23 that one portion of it is outside the arm 31 and a projecting portion 33 is inside the said arm and extends to a point vertically below the axis of the shaft 32. A projecting pin 34 on one end of the roller 9, and near the periphery thereof, is adapted to engage the portion 33 of the beam once during each rotation. As the roller 9 continues to rotate, after the pin 34 and the portion 33 of the beam are engaged, the dipper 23 is slowly lowered into the well 21. At a point vertically below the axis of the shaft 32, the pin is suddenly disengaged from the end of the portion 33 of the beam to permit the weight member 29 to quickly withdraw the dipper from the well. This quick action causes a film of ink to form in the dipper, otherwise the skin effect of the ink in the well would draw the ink in the dipper back into the well.

During the operation of my device, the dipper is adapted to be periodically submerged, as above described, and to be in its position out of the well at predetermined times when the pen is periodically returned to its initial position. When the pen is thus returned, one end of the tube 22 engages the film of ink in the dipper 23 and conveys the same to the pen 11 by capillary attraction.

In Fig. 2 is shown a dipper 35, having a bottom that is slightly inclined toward the pen and an open end adjacent to the pen, that is adapted to contain a globule of ink when withdrawn quickly from the well. A siphon tube 36 is provided for conveying ink from the dipper to the pen by the combination of capillary and siphon action.

As shown in Fig. 3, the pen 11 is provided with a slightly inclined channel extension 37 for conveying ink from the dipper to the pen by combined capillarity and gravity.

While I have shown and described particular forms of my invention, it is to be understood that many changes may be effected within the spirit and scope of my invention, as set forth in the appended claims.

I claim as my invention:

1. The combination with a marking device adapted to oscillate across the face of a record blank, of means for automatically supplying the same with a marking material at the beginning of said oscillations.

2. A marking device comprising a movable pen and independent means operable when the pen is in its initial position only for supplying ink to the pen.

3. A marking device comprising a pen adapted to coöperate with a movable record blank and means actuated by the movement of the record blank for supplying ink to the pen at the initial position only of said pen with respect to said blank.

4. A marking device comprising a movable pen adapted to coöperate with a movable record blank and means that is responsive to the movement of the record blank for supplying ink to the pen at the initial position only of the pen with respect to the blank.

5. A marking device comprising an oscillatory pen, a record blank adapted to move in steps and means that is operated by the record blank at the beginning of predetermined steps of its movement for supplying ink to the pen.

6. In a marking device, the combination with an oscillatory pen, of a well, a dipper movable into and out of said well and a member adapted to transfer ink from the dipper to the pen.

7. In a marking device, the combination with an oscillatory pen, of a well, a dipper that is adapted to be periodically dipped into and withdrawn from the well, and a member adapted to transfer ink from the dipper to the pen.

8. In a marking device, the combination with an oscillatory pen, of a well, a dipper movable into and out of said well and a member adapted to transfer ink from the dipper to the pen at the beginning of each oscillation of the pen.

9. In a marking device, the combination with a pen and an ink well, of a capillary film-forming dipper movable into and out of said well, and a member adapted to carry the ink from the dipper to the pen.

10. In a marking device, the combination with a pen and an ink well, of a dipper movable into and out of said well, and a member adapted to convey the ink from the dipper to the pen by capillary attraction.

11. In a marking device, the combination with a pen and a well, of a capillary film-forming dipper movable into and out of said well, and a member adapted to convey the ink from the dipper to the pen by capillary attraction.

12. A marking device comprising a pen, a well, and a dipper movable into and out of said well to convey ink from the well to the pen.

13. In a marking device, the combination with a pen and an ink well, of a dipper movable into and out of said well, and a member adapted to siphon the ink from the dipper to the pen.

In testimony whereof, I have hereunto subscribed my name this 20th day of July, 1917.

JOHN HAROLD MILLER.